United States Patent [19]  [11]  4,388,763
Masclet et al.  [45]  Jun. 21, 1983

[54] DEVICE FOR THE DETECTION OF THE DISPLACEMENT OF AT LEAST ONE POINT RELATIVE TO A REFERENTIAL, AND APPLICATION OF THE DETECTION OF THE UNDERINFLATED STATE OF TIRES AND/OR OF MASS AND CENTERING FOR AERODYNES

[75] Inventors: Jean Masclet, Paris; Jacques Veaux, Chatillon, both of France

[73] Assignee: Messier-Hispano-Bugatti, Mongrouge, France

[21] Appl. No.: 234,875

[22] Filed: Feb. 17, 1981

[30] Foreign Application Priority Data

Feb. 20, 1980 [FR] France .............................. 80 03701
Jun. 12, 1980 [FR] France .............................. 80 13050

[51] Int. Cl.³ ............................................. G01B 5/24
[52] U.S. Cl. ............................ 33/203.18; 33/180 AT; 33/181 AT; 73/146; 73/146.2

[58] Field of Search ............ 73/862.04, 862.05, 146.2, 73/146.5, 146, 705; 356/373, 372, 138, 152; 33/180 R, 281, 338, 180 AT, 181 AT, 203.18

[56] References Cited

U.S. PATENT DOCUMENTS 2,587,628  3/1952  King .......................................... 73/11
3,370,296  2/1968  Greenberg ....................... 73/862.04
3,590,633  7/1971  Fuhrmann ............................ 73/146
3,775,859  12/1973  Sauterel ................................ 33/338

Primary Examiner—Donald O. Woodiel
Attorney, Agent, or Firm—McAulay, Fields, Fisher, Goldstein & Nissen

[57]  ABSTRACT

Devices for detecting the displacement of an element relative to a referential. A first end of a recopying bar is connected with the element and the other end is capable of cooperating with a mechanism for determining the displacement of this second end relative to the referential. The device is particularly useful for determining the deformation on landing gears of aerodynes.

20 Claims, 2 Drawing Figures

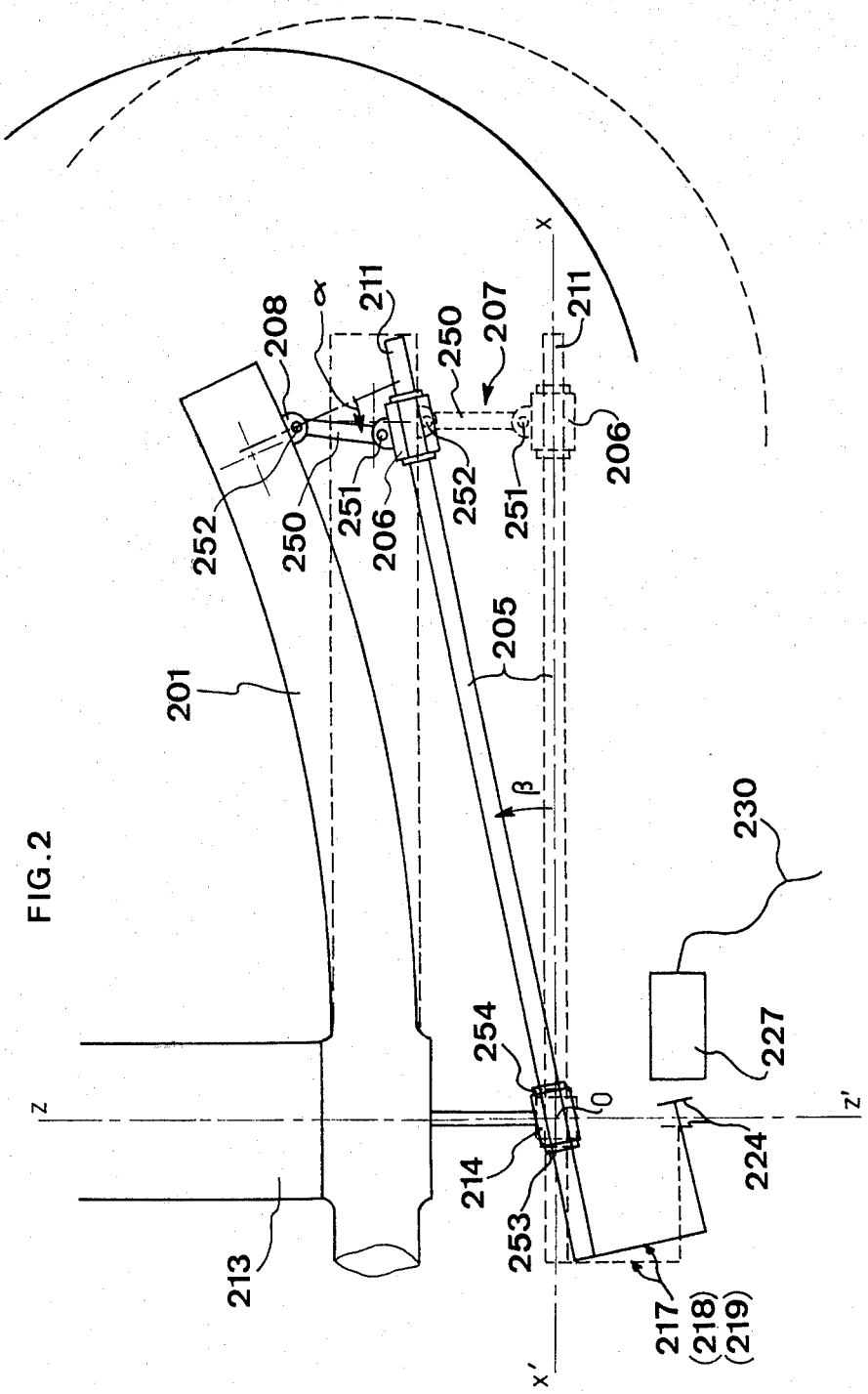

DEVICE FOR THE DETECTION OF THE DISPLACEMENT OF AT LEAST ONE POINT RELATIVE TO A REFERENTIAL, AND APPLICATION OF THE DETECTION OF THE UNDERINFLATED STATE OF TIRES AND/OR OF MASS AND CENTERING FOR AERODYNES

The present invention relates to devices detecting the displacement of at least one point relative to a referential, applicable more particularly in systems determining the underinflated state of tires, and/or of centering mass (sic) for aerodynes equipped with main landing gears with balance beam, bearing, for example, a pair of wheels equipped with dual tires and disposed in parallel planes on either side of the balance beam.

Devices detecting the displacement of at least one point on a physical body are already known; a large majority of the latter are constituted essentially by a piece that follows the displacement of the body on which the point is situated, and stress gauges linked to the piece, which interpret the displacement of the point.

These devices give good results in certain cases of application, but they have drawbacks in spite of all. This is due in particular to the gauges themselves which have to be stuck onto the piece. Since this piece follows the deformations, it happens that the gauges become unstuck and no longer serve their purpose. Furthermore, the deformations of this piece are not faithful to the deformations of the body, and they can yield erroneous measurements.

And finally, it is very difficult, with this type of measurement, to break the deformations down, and hence to analyze them for interpretation.

The present invention has the object of relieving this drawback and to embody a device that will detect, in a simple but precise manner, the displacement of at least one point on a given body, relative to a referential.

More precisely, the object of the present invention is, more particularly, a device detecting the displacement of an element relative to a referential, characterized by the fact that it comprises a recopying bar, means connecting a first end of the said bar with the said element, the other, second, end of the said bar being able to cooperate with means determining the displacement of this second end relative to the said referential.

According to another characteristic of the present invention, the means determining the displacement of this second end comprise at least one pickup having at least two active parts, one being situated on the said bar recopying bar, the other being fixed relative to the said referential.

According to another characteristic of the present invention, the device comprises a second pickup, the first and second pickups being situated on two non-merged axes converging on a point. Other characteristics and advantages of the present invention will appear on reading the following describing, given in reference to the drawings, attached by way of illustration, without any limiting character, in which:

FIG. 2 represents, schematically, another embodiment of a device according to the invention.

Figure 1:
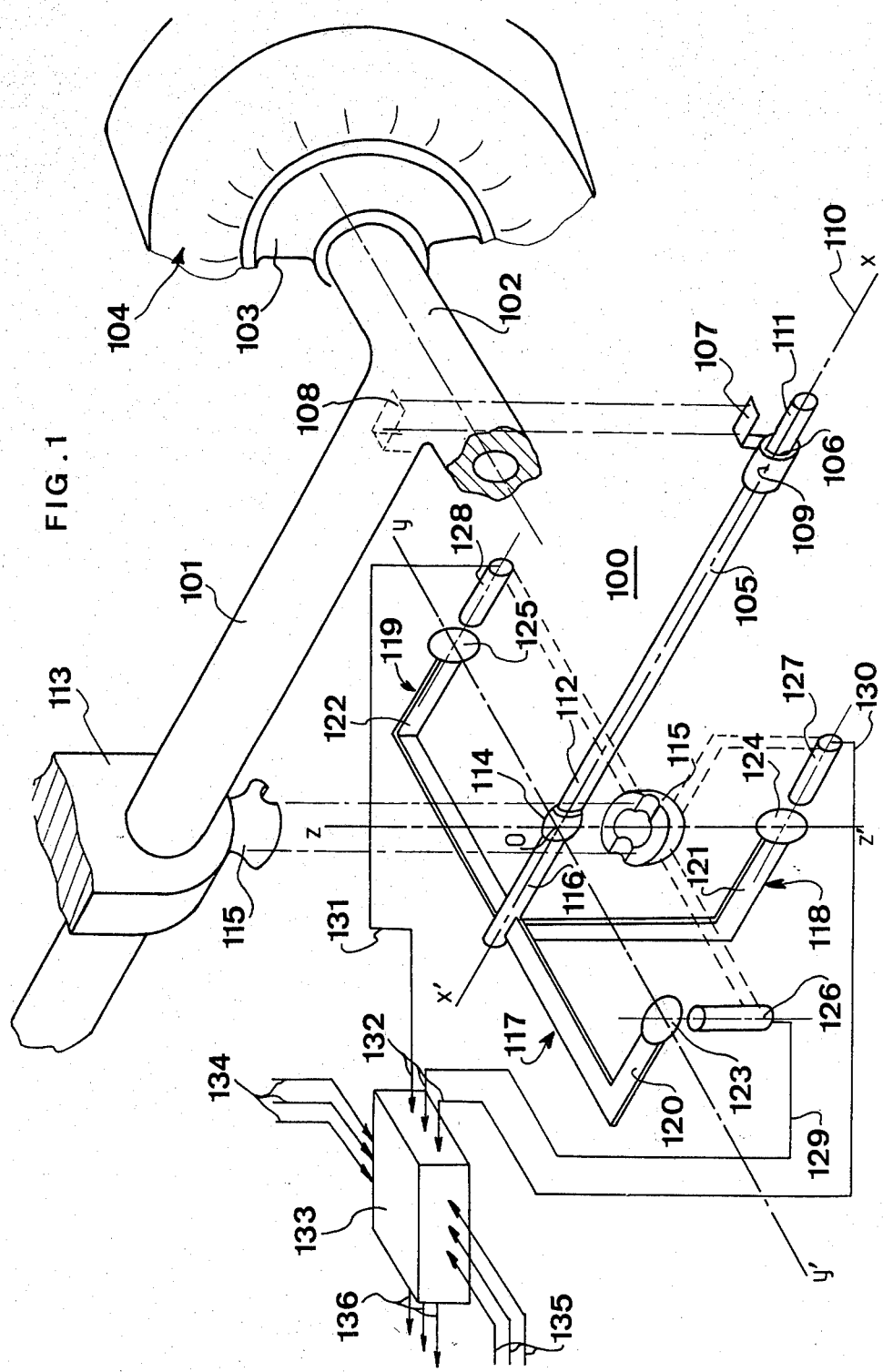
FIG. 1 represents, in an exploded, semi-cutaway schematic view, an embodiment of a device according to the invention, as applied to aerodynes for determining the displacement of a balance bar on a main landing gear, relative to the leg which supports it.

FIG. 1 represents, schematically, in an exploded, cutaway view, an embodiment of a device 100 for detecting the displacement of at least one point, for example on a balance beam 101 of a landing gear of an aerodyne having, for example on an axle 102, a wheel 103 with a tire 104.

This device comprises a bar 105, preferably cylindrical, made of a rigid but light material, for example, of aluminum alloy. This bar 105 is linked at its end 111 to balance-beam 101 by a link such as a swivel 106 integral with an attachment tab 107 which will be integrated with the balance-beam, preferably, in this application, in the vicinity of its part 108 which supports the axle 102 of the wheels. It is clearly specified that this swivel 106 enables the axis, essentially, to pivot around a point defined substantially in the figure at 109 on axis 110, but absolutely not around this axis 110. As a matter of fact, this swivel 106 is equivalent to a universal joint in which one degree of liberty has been eliminated; the one preventing bar 105 from turning on itself.

This bar cooperates, substantially at its other end 112, with a referential which, in this example of embodiment will be linked to leg 113, supporting balance beam 101.

This bar cooperates with this referential through a swivel 114, represented in general by a part 115 fixed on leg 113, or perhaps on balance beam 101 close to the leg, at a point which could be considered with good approximation as relatively fixed relative to leg 113 or to the body of the aircraft.

It is further specified that this swivel advantageously permits a translation of the rod 105 in the body of swivel 114.

In an advantageous embodiment as represented in the figure, the end 112 of bar 105 projects to a substantial extent beyond swivel 114 and emerges from the latter at 116 in a part opposite that fixed by tab 107 on balance beam 101, relative to swivel 114.

This part 116 cooperates, respectively, with three pickups 117, 118, 119, making it possible to determine the position of this end part 116 of the bar. Each pickup comprises an arm 120, 121, 122, fixed on the end 116 of bar 105, and terminated by a so-called target part 123, 124, 125 formed of a relatively plane palette able to cooperate with a detection member or probe 126, 127, 128, placed facing this palette, and which is kept stationary relative to the referential, that is to say, in this embodiment, to leg 113, by means of part 115.

To make it possible to determine each displacement of the end 116 of the bar and do so in a discriminatory fashion in a very advantageous embodiment, the three pickups in their structure defined above are disposed in a predetermined fashion relative to the resting position of the bar as defined below.

First of all, to facilitate comprehension, a fictive orthogonal reference; 0; x, x'; y, y'; z, z': will be considered; this being linked for example to a section of reference on balance beam 101, bar 105 being disposed in such a way that the point of origin 0, and so that, in its resting position, the axis 0 x will be merged with the axis of bar 105. Axis 0 (z) is preferably chosen perpendicular to the plane in which the probability of displacement, for example, of the balance-beam, is the greatest, and finally, in consequence, axis 0 z is deduced from the two others and thus finds itself in the plane just mentioned above.

Thus, for the first pickup 117, pallette 123 is centered on axis 0 y and, in order that its plane surface will be situated in plane 0 y', 0 x, for the second pickup 118, palette 124 is situated on axis 0 z', and in such a way that its plane surface will be in the plane 0 z', 0 y and, finally, for the third pickup 119, palette 125 is centered on axis 0 y and in such a way that its plane surface will be in the plane 0 y, 0 z.

Of course, the detectors 126, 127 and 128 are disposed relative to the palette in accordance with the requirements of detection, the latter being represented schematically by cylinders perpendicular to the plane of the palettes when they are in the position with the bar at rest.

These pickups can, for example, be inductive pickups, or pickups with differential transformer, like those sold by the VIBRO METER company -Ref. 102, which can emit a, (preferably) electric signal at the output, which will be a function of the mean distance separating the surface of the palette from the input face of each detector.

Thus, each output 129, 130, 131 of the detectors 126, 127, 128 is connected to the input 132 of an electronic computer circuit 133 which can receive other detection signals from, perhaps, other measuring systems, and which can emit at its output 136, data that can be used, particularly in the case of aerodynes, by the pilots to determine, for example, the state of underinflation of one of the tires of a landing gear.

The device works as follows.

In the resting position of bar 105 and hence of balance-beam 101, palettes 123, 124 and 125 are in the planes defined above.

To facilitate understanding of the working, four separate cases will be considered, from which all others can be deduced.

In a first case it is assumed that the balance-beam warps in such a way that it bends, as it rises, while remaining in the plane 0 z, 0 x. As a result, balance-beam 101, by means of tab 107, pulls on the end 111 of bar 105. This bar, by means of swivel 114, pivots around point 0 without warping, and entrains, in the same rotation, all of the three pickups. In the hypothesis selected this rotation is equivalent to a rotation around axis y', y. As a result, the mean distance from respective palettes 123 and 125 remains the same relative to their detectors 126 and 128, and no significant signal is then sent out by these detectors. But, in its rotation around y, y', the bar entrains arm 121 and palette 124 in a displacement that tends to bring palette 124 closer to detector 127. The latter will emit corresponding signal which will be interpreted by computer circuit 133.

In the second case, it is assumed that the balance-beam is subjected to a force which tends to twist it, while remaining in a plane parallel to the plane (y'oy, x'ox). Bar 105 is then subjected to a rotation around point 0, but also around axis zz'.

In this movement, palettes 123 and 124 remain substantially the same distance, real or mean, from their respective detectors 126 and 127, since palette remains in plane y'ox, and palette 124 rotates around axis oz'. But palette 125 moves toward or away, depending on the direction of deformation of balance-beam 101, and detector 128 emits a corresponding signal which will very easily be interpreted by computer circuit 133.

In a third case, it is assumed that the balance beam "stretches" or "contracts," while only the two detectors are affected by a corresponding movement toward or away, respectively, of the two parts 124 and 125. Palette 123, however, still remains the same distance from its detector 126.

And finally, in the fourth case, it is assumed that the balance-beam undergoes a torsion, which happens when one of the tires, such as 104, is deflated. In this case, then, bar 105, since it is fixed by tab 107, undergoes at least a rotation which, in a first approximation, can be compared to a rotation substantially around its own axis x'x, with another rotation around point 0. Then palette 123, depending on the direction of torsion of balance-beam 101, will move toward or away from its detector 126 which emits a corresponding signal at its output 129, representative of the torsion of the balance-beam.

It is quite clear that the hypotheses of deformation envisaged above can occur, but in many cases they will be composition deformations.

In any event, the computer circuit can make allowance for all the signals emitted to the outputs 129, 130 and 131, and can process data representative of the real deformation, for example, of the balance-beam, and specialists can draw the necessary consequences thereof.

The device described above gives good results, and the electronic circuit 133, as a function of the data received from the various probes, can reveal the position of the end 116 of bar 105.

But, for certain applications, and in particular a bending of balance-beam 101, it is found that, owing to the rigid attachment 107, a single bending of balance beam 101 can be interpreted by the bar by a rotation plus a translation, and therefore the two pickups 118 and 119 are affected. These two movements can, of course, be interpreted electronically. But with a view to simplification, it is possible to embody a device which, for such a deformation, affects only pickup 118. The embodiment illustrated in FIG. 2 permits the obtention of this result.

The device comprises a bar 205 associated with three pickups 217, 218, 219, formed of a target 224 and a probe 227, in the same fashion as pickups 117, 118 and 119. This bar is mounted on a first swivel 214 linked to referential 0 x, y, z, but this swivel does not permit a translation, the latter being prevented by any means such as, for example, two plates 253 and 254 which are integral with the bar, but permit rotation on itself.

At its other end 211, the bar has means of linkage comprising a swivel 206 and a connecting rod 250 mounted rotatably with a single degree of liberty in a plane on two axes 251 and 252, respectively on swivel 206 and on the balance-beam. These two axes are perpendicular to the plane mentioned above which is selected, in fact, as the one in which the bending of the balance beam can occur.

Thus, for any other deformation of the balance beam in another plane than the one mentioned above, connecting rod 250 constitutes a rigid link between balance beam 201 and the end 211 of bar 205.

In FIG. 2, the balance beam 201 and bar 205 are shown in dotted lines in a normal position of rest, and in solid lines, the bar and the beam after a bending in a plane. In this case, for a deformation by bending of the balance beam, the point of attachment 208 of the connecting rod 250 on the balance beam pulls on the bar causing it to undergo a rotational beta around a point 0 on the referential, but, owing to the particular configuration of swivel 214, the bar is not translated on itself. The connecting rod, however, pivots over an angle alpha around the two axes 251 and 252 because the point of attachment 208 moves away from point 0 in this configuration in which the bar is below the balance beam.

The relative movements of balance-beam 201, connecting rod 250 and bar 205 appear clearly in the figure where the latter have been exaggerated for clarity. Thus, pickup 218 only emits a signal representative of a bending of the balance rod, the other two pickups not being affected to a significant extent.

The device described above finds particularly advantageous applications, especially in the case of the detection of the underinflated state of the tires of an aerodyne.

In this case, the recopying bar is fixed at a point on the landing gear as close as possible to the tires, while its other end is brought to a point on the gear which, owing to its structure, undergoes few deformations when, for example, one of the tires is not adequately inflated, or is even punctured.

The deformation undergoes by the gear, and especially the part in proximity to the tires, is analyzed by the signals emitted by the pick-ups, and a variation in the value of the state of inflation of the tires is deduced.

This could enable the pilot of such an aerodyne to intervene and, for example, avoid a takeoff under poor conditions which could even be catastrophic.

In another application, the device makes it possible to detect, and perhaps even measure the mass and the centering of the total masses of an aerodyne. It is found, as a matter of fact, that, depending on the mass embarked on board an aerodyne, the deformations of the landing gears, more particularly at the level of the attachments of the tires, are indicative of this mass embarked, and consequently of the total mass of this aerodyne.

Thus, by analysing the signals emitted by the pickups, it is possible, particularly for the pilot of such an aerodyne, to deduce therefrom the mass of his aircraft and whether these masses are perfectly centered relative to the body of the aircraft.

We claim:

1. Device for detecting the displacement of an element relative to a referential comprising:
   a recopying bar:
   means connecting a first end of said bar with an element, the other end of said bar being capable of cooperating with means determining the displacement of said second end relative to said referential;
   said means determining the displacement of said second end comprising at least one pickup having at least two active parts, one of said parts being situated on said recopying bar, and the other of said parts being fixed relative to said referential;
   a second pickup, said two pickups being situated on two first, unmerged axes (oy,oz') converging to a point (0), said point (0) belongs to said recopying bar;
   means for holding said recopying bar in such a way that said point (0) will be substantially fixed relative to said referential; and
   said means holding said recopying bar including a swivel surrounding said recopying bar, said swivel being fixed to said referential.

2. The device according to claim 1, wherein said recopying bar is mounted in said swivel with no degree of liberty in translation, said connecting means including a second swivel and a connecting rod mounted rotatably around two parallel axes situated respectively on said second swivel and on said recopying bar.

3. The device according to claim 1, wherein said recopying bar is mounted in said swivel having a degree of liberty in translation.

4. The device according to claim 3, wherein the first part of said pickups include an arm fixed to said recopying bar outside said point, and a target integral with said arm capable of cooperating with second part of said pickups constituting a member capable of emitting a signal which is a function of the distance separating said target from said member.

5. The device according to claim 4, wherein said member and target are situated in the vicinity of a plane (oy,oz') passing through said point (0), and substantially perpendicular to the said bar in its position of rest.

6. The device according to claim 5, wherein said two pickups are situated substantially in the said plane.

7. The device according to claim 4, including a third pickup situated on a third axis (oy') not merged with the said two first axes (oy,oz'), but converging on the same said point (0).

8. The device according to claim 4, wherein said two pickups are situated substantially in the said plane.

9. Device for detecting the displacement of an element relative to a referential comprising:
   a recopying bar;
   means connecting a first end of said bar with an element, the other end of said bar being capable of cooperating with means determining the displacement of said second end relative to said referential;
   said means determining the displacement of said second end comprising at least one pickup having at least two active parts, one of said parts being situated on said recopying bar, and the other of said parts being fixed relative to said referential;
   a second pickup, said two pickups being situated on two first, unmerged axes (oy,oz') converging to a point (0), said point (0) belongs to said recopying bar;
   means for holding said recopying bar in such a way that said point (0) will be substantially fixed relative to said referential;
   said means holding said recopying bar including a swivel surrounding said recopying bar, said swivel being fixed to said referential; and
   the first part of said pickups include an arm fixed to said recopying bar outside said point, and a target integral with said arm capable of cooperating with the second part of said pickups constituting a member capable of emitting a signal which is a function of the distance separating said target from said member.

10. The device according to claim 9, wherein said member and said target are situated in the vicinity of a plane (oy,oz') passing through said point (0), and substantially perpendicular to said bar in its position of rest.

11. The device according to claim 10, wherein said two pickups are situated substantially in the said plane.

12. The device acording to claim 9, wherein said two pickups are situated substantially in the said plane.

13. The device for detecting the displacement of an element relative to a referential comprising:
   a recopying bar;
   means connecting a first end of said bar with an element, the other end of said bar being capable of cooperating with means determining the displacement of said second end relative to said referential;
   said means determining the displacement of said second end comprising at least one pickup having at least two active parts, one of said parts being situated on said recopying bar, and the other of said parts being fixed relative to said referential;

a second pickup, said two pickups being situated on two first, unmerged axes (oy,oz') converging to a point (0), said point (0) belongs to said recopying bar;

means for holding said recopying bar in such a way that said point (0) will be substantially fixed relative to said referential;

said means holding said recopying bar including a swivel surrounding said recopying bar, said swivel being fixed to said referential; and a third pickup situated on a third axis (oy') not merged with the said two first axes (oy,oz'), but converging on the same said point (0).

14. The device according to claim 13, wherein the first part of said first and said second pickups include an arm fixed to said recopying bar outside said point, and a target integral with said arm capable of cooperating with the second part of said pickups constituting a member capable of emitting a signal which is a function of the distance separating said target from said member.

15. The device according to claim 14, wherein said member and target are situated in the vicinity of a plane (oy,oz') passing through said point (0), and substantially perpendicular to the said bar in its position of rest.

16. The device according to claim 14, wherein said two pickups are situated substantially in the said plane.

17. The device according to claim 13, wherein said member and a target are situated in the vicinity of a plane (oy, oz') passing through said point (0), and substantially perpendicular to said bar in its position of rest.

18. The device according to claim 13, wherein said two pickups are situated substantially in the said plane.

19. The device according to claim 13, wherein said recopying bar is mounted in said swivel with no degree of liberty in translation, said connecting means including a second swivel and a connecting rod mounted rotatable around two parallel axes (251,252) situated respectively on said second swivel and on said recopying bar.

20. The device according to claim 13, wherein said recopying bar is mounted in said swivel having a degree of liberty in translation.

* * * * *